US009640992B1

(12) United States Patent
Nay et al.

(10) Patent No.: US 9,640,992 B1
(45) Date of Patent: May 2, 2017

(54) SYSTEM AND METHOD FOR VOLTAGE CONTROLLED INITIALIZATION (71) Applicant: Google Inc., Mountain View, CA (US)

(72) Inventors: Shane R. Nay, San Jose, CA (US); Maire Mahony, Mountain View, CA (US)

(73) Assignee: Google Inc., Mountain View, CA (US)

( * ) Notice: Subject to any disclaimer, the term of this patent is extended or adjusted under 35 U.S.C. 154(b) by 718 days.

(21) Appl. No.: 13/803,043

(22) Filed: Mar. 14, 2013

Related U.S. Application Data (60) Provisional application No. 61/670,185, filed on Jul. 11, 2012.

(51) Int. Cl.
H02J 3/00 (2006.01)
(52) U.S. Cl.
CPC .................................... H02J 3/00 (2013.01)
(58) Field of Classification Search
CPC ........ H02J 3/00; H02J 4/00; H02J 1/10; H02J 1/14; H02J 3/005; H02J 3/385; H03L 7/00; Y10T 307/391; Y10T 307/32
USPC ....................... 307/32, 24, 29, 39
See application file for complete search history.

(56) References Cited

U.S. PATENT DOCUMENTS

2004/0263222 A1* 12/2004 Tseng ................... H03K 3/3565
327/143
2011/0006600 A1* 1/2011 Fontana .................... H02J 1/10
307/25
2012/0176826 A1* 7/2012 Lazar .................... H02M 3/158
363/126

OTHER PUBLICATIONS

Load Sharing with Paralleled Power Supplies, Bob Mammano and Mark Jordan, 16 pages, Texas Instruments Incorporated, 2001; retrieved from the Internet Feb. 3, 2012.

* cited by examiner

Primary Examiner — Fritz M Fleming
Assistant Examiner — Thai Tran
(74) Attorney, Agent, or Firm — Lerner, David, Littenberg, Krumholz & Mentlik, LLP (57) ABSTRACT An apparatus and method for initializing electrical devices based on a voltage level. The voltage level may be modified to a particular setting based on the availability of power supply components, such as AC to DC rectifiers. Depending upon the availability of the power supply components, a control system may alter output voltage to a particular level. The components receiving power may be coupled to voltage dividers, where the voltage dividers are configured to modify an input voltage to cause or prevent the input voltage from rising above an initialization level for the particular component. The output voltage may be set by the control system such that a number of components that experience a voltage rise above an initialization threshold correspond to the number of available power supply components.

20 Claims, 4 Drawing Sheets

SYSTEM AND METHOD FOR VOLTAGE CONTROLLED INITIALIZATION

CROSS-REFERENCE TO RELATED APPLICATION

The present application claims the benefit of U.S. Provisional Application No. 61/670,185, filed Jul. 11, 2012, the entire disclosure of which is hereby incorporated by reference.

BACKGROUND

The need for increased secure storage and reliable hosting of data has led to the proliferation of so-called "enterprise" computer data systems. These enterprise computer systems are typically engineered to address the specific needs of large scale data serving and hosting. In many cases, multiple enterprise computer systems are maintained at a single data center. Larger data centers can include hundreds or even thousands of individual computer systems at a single location. In order to efficiently manage these computer systems, multiple hardware devices may be stored in a single structure known as a "rack."

Computer hardware devices typically require direct current (DC) power to operate, while power is typically transmitted on the power grid as alternating current (AC). As such, computer devices typically employ the use of a rectifier to convert the AC power to DC power. Computer hardware racks may employ a single rectifier or set of rectifiers to power all of the components coupled to the rack. These rectifiers are connected to AC power received via the power grid and converted to DC power suitable for powering the components of the rack.

In many cases, multiple rectifiers are used for a single rack because a single rectifier would not output enough current to power all of the components on the rack. However, when multiple rectifiers are employed, individual rectifiers may suffer equipment failures, thus lowering the overall power available to the components coupled to the rack. Attempting to initialize more components than the functioning rectifiers can support may result in a drop in voltage, preventing any of the rack-mounted components from reaching a minimum initialization voltage. While the power supply may be able to test whether individual rectifiers are operable, altering the initialization of the rack-mounted components may require specific programming to instruct the rack-mounted components as to whether they may draw current from the power source without causing a failure of the power source or the rack-mounted components.

SUMMARY

Aspects of the disclosure include a method for providing power to a plurality of electrical devices. The method comprises receiving status information from one or more power supply components of one or more power supplies. The status information indicates an amount of current or power the one or more power supplies are capable of outputting. The method further comprises selecting an output voltage based on the status information, where the output voltage is selected to initialize a first subset of the plurality of electrical devices. The first subset does not include all of the plurality of electrical devices. The method also includes controlling, with a controller, the one or more power supplies to provide the selected output voltage to the first subset of the plurality of electrical devices so that the first subset is initialized. And the method also includes reducing the selected output voltage below an initialization threshold of a second subset of the plurality of electrical devices so that the second subset is not initialized.

In one example, the output voltage is determined in a particular voltage range. Here, the method may further comprise determining a power output percentage from the status information. The power output percentage corresponds to a current power output level of the one or more power supplies divided by a maximum power output level of the one or more power supplies. In this case, selecting the output voltage may be done such that the output voltage is a sum according to the equation:

$$v_{out} = v_{min} + (p * (v_{max} - v_{min})),$$

where $v_{out}$ is the output voltage, $v_{min}$ is a minimum voltage in the particular voltage range, p is the power output percentage, and $v_{max}$ is a maximum voltage in the particular voltage range.

In another example, the power supply components are rectifiers. In a further example, the electrical devices are at least one of rack-mounted server arrays or rack-mounted disk arrays. In yet another example the method is performed by a shelf controller.

According to one alternative, the output voltage is greater than a predefined initialization voltage for the electrical devices. In another alternative, the method further comprises adjusting the selected output voltage to remain above a predefined initialization voltage for the first subset of electrical devices after initialization. In a further alternative, the selected output voltage is reduced by at least one voltage divider coupled between the one or more power supplies and the second subset of the plurality of electrical devices. And in yet another alternative, the first subset of the plurality of electrical devices is chosen such that initialization of the first subset of the plurality of electrical devices draws less current than the one or more power supplies are rated to support.

According to another aspect of the disclosure, an apparatus for providing power to a plurality of electrical components is provided. The apparatus comprises at least one voltage divider coupled to at least one of the plurality of electrical components, and a power supply for providing power to the plurality of electrical components at a particular output voltage. The power supply includes one or more power supply components and a controller coupled to the one or more power supply components. The controller is configured to receive status information from the one or more power supply components. The status information indicates an amount of current or power the power supply is capable of outputting. The controller is also configured to select an output voltage based on the status information and to control the power supply. The output voltage is selected to initialize a first subset of the plurality of electrical devices, where the first subset does not include all of the plurality of electrical devices. The power supply is controlled to provide the selected output voltage to the first subset of the plurality of electrical devices so that the first subset is initialized. The controller is also configured to reduce the selected output voltage below an initialization threshold of a second subset of the plurality of electrical devices so that the second subset is not initialized.

In one example, the selected output voltage is reduced below the initialization threshold using the at least one voltage divider. In another example, the one or more power supply components are rectifiers. In a further example, the one or more power supply components communicate the status information to the controller via a power management bus.

According to one alternative, the output voltage is determined in a particular voltage range. In this case, the controller may be further configured to determine a power output percentage from the status information, wherein the power output percentage corresponds to a current power output level of the power supply divided by a maximum power output level of the one or more power supplies. The controller is configured to select the output voltage such that the output voltage is the sum according to the following equation:

$$v_{out} = v_{min} + (p*(v_{max} - v_{min})),$$

where $v_{out}$ is the output voltage, $v_{min}$ is a minimum voltage in the particular voltage range, p is the power output percentage, and $v_{max}$ is a maximum voltage in the particular voltage range.

In accordance with another aspect of the disclosure, a non-transitory computer readable storage medium comprising instructions that, when executed by a processor, cause the processor to perform a method for providing power to a plurality of electrical devices. The method comprises receiving status information from one or more power supply components of one or more power supplies and selecting an output voltage based on the status information. The status information indicates an amount of current or power the one or more power supplies are capable of outputting. The output voltage is selected to initialize a first subset of the plurality of electrical devices, where the first subset does not include all of the plurality of electrical devices. The method also includes controlling the one or more power supplies to provide the selected output voltage to the first subset of the plurality of electrical devices, such that the first subset of the plurality of electrical devices is initialized, and reducing the selected output voltage below an initialization threshold of a second subset of the plurality of electrical devices so that the second subset is not initialized.

In one example the output voltage is determined in a particular voltage range. In this case, the instructions may further comprise determining a power output percentage from the status information, wherein the power output percentage corresponds to a current power output level of the one or more power supplies divided by a maximum power output level of the one or more power supplies. Selecting the output voltage is done such that the output voltage is a sum of chosen via a formula:

$$v_{out} = v_{min} + (p*(v_{max} - v_{min})),$$

where $v_{out}$ is the output voltage, $v_{min}$ is a minimum voltage in the particular voltage range, p is the power output percentage, and $v_{max}$ is a maximum voltage in the particular voltage range. And in one example, the power supply components are rectifiers.

DETAILED DESCRIPTION

The aspects, features and advantages of the present disclosure will be appreciated when considered with reference to the following description of preferred implementations and accompanying figures. The following description does not limit the disclosure; rather, the scope is defined by the appended claims and equivalents.

While certain processes in accordance with example implementations are shown in the figures as occurring in a linear fashion, this is not a requirement unless expressly stated herein. Different processes may be performed in a different order or concurrently.

The disclosure describes an apparatus and method for initializing electrical devices, such as computers or computer systems, based on a voltage level. The voltage level may be modified to a particular setting based on the availability of power supply components, such as AC to DC rectifiers. Depending upon the availability of the power supply components, a control system may alter output voltage to a particular level. The components receiving power may be coupled to voltage dividers, where the voltage dividers are configured to modify an input voltage to cause or prevent the input voltage from rising above an initialization level for the particular component. The output voltage may be set by the control system such that a number of components that experience a voltage rise above an initialization threshold correspond to the number of available power supply components.

Figure 1:
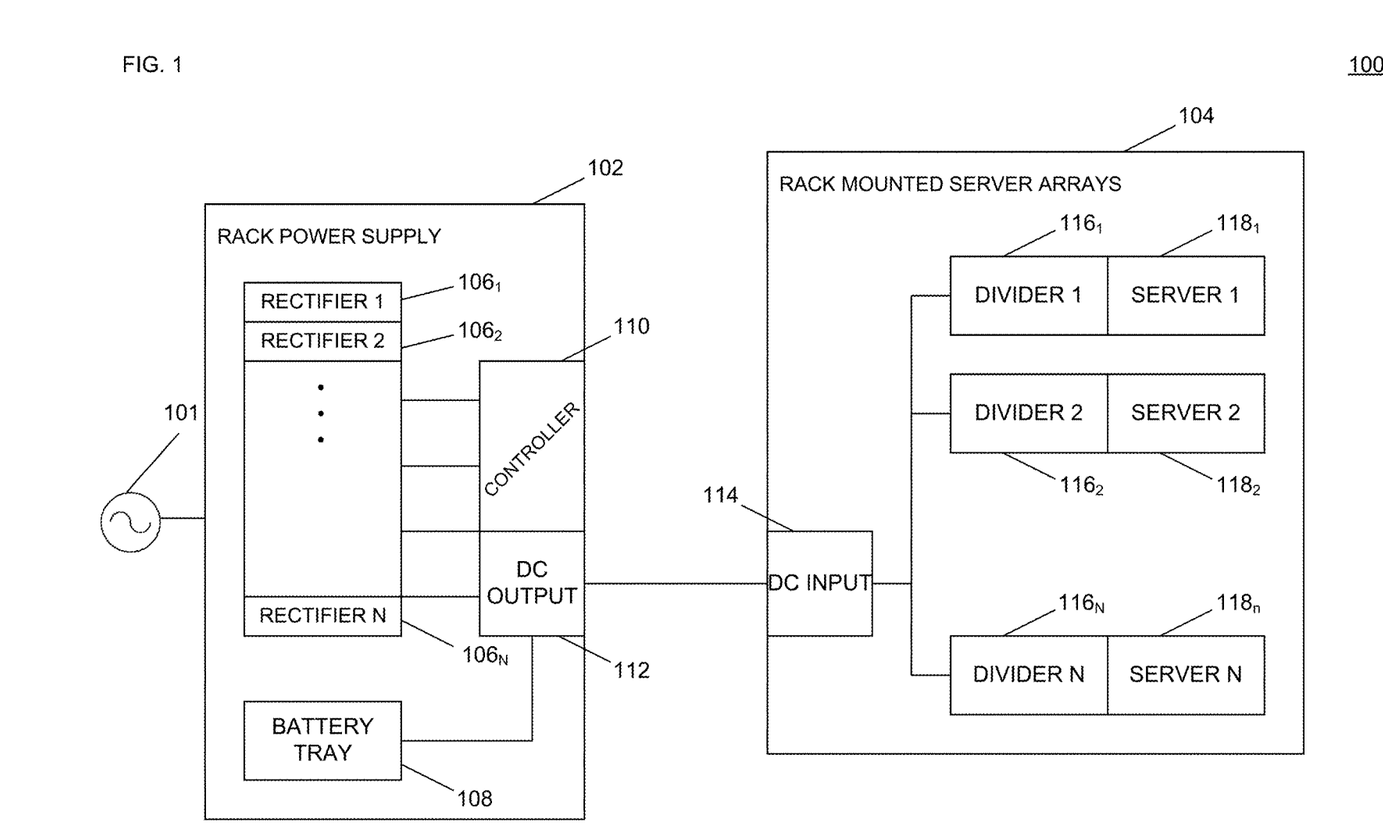
FIG. 1 is a system diagram depicting an example of a rack power supply coupled to a set of rack mounted server arrays in accordance with aspects of the disclosure.

FIG. 1 presents a system diagram of a computer system rack 100. The rack 100 includes a power supply 102 and a set of rack mounted server arrays 104. The power supply 102 and the rack mounted server arrays 104 may be integrated into a single shelf or rack, or they may be separated into multiple physical rack structures. The power supply 102 functions to provide power to the components associated with the server arrays 104. The power supply 102 may be coupled to an AC power source 101, such as power provided to a power grid by an electrical company or a generator. For example, the power source 101 may be a 120 volt wall outlet or other connection to the power grid. The rack power supply 102 may include one or more rectifiers $106_1$, $106_2$, ... $106_N$. The rectifiers 106 function to convert the alternating current received from the power source 101 into direct current suitable for powering the server arrays 104. The rack power supply 102 may include multiple rectifiers 106 in order to provide redundant power for the server arrays 104, such that if a rectifier 106 fails, direct current is still produced. Each rectifier 106 may output a certain amount of current, such that if one or more of the rectifiers 106 fail, less current may be output to the server arrays 104. If the server arrays 104 draw more current than the functioning rectifiers can provide, this may result in a drop in voltage output to the server arrays 104. Although the instant examples are described with particular respect to the rectifier components of the power supply, the same techniques could apply to any particular component or components of the power supply that might affect the number of devices that can safely be provided with power.

The rack power supply 102 may also include a controller 110 and a DC output 112. The controller 110 monitors the equipment status of other components of the power supply, such as the rectifiers 106, and controls the voltage output via the DC output 112. For example, the controller 110 may be a shelf controller that manages other components present on the rack. The DC output 112 provides an interface to the server arrays 104 for transmission of the direct current provided by the rectifiers 106. If one or more rectifiers 106 are non-functional, the controller 110 may dynamically alter the voltage output via the DC output 112 in order to control initialization of components present on the server arrays 104. This process is described further below (see FIGS. 2-4).

The rack power supply 102 may also include a battery tray 108. The battery tray 108 may provide battery power to the server arrays 104 in the event of a failure of the power source 101. The battery tray 108 may include one or more batteries. The battery tray 108 may also include a controller that manages battery charging and discharge, based on the DC Output 112. The controller 110 may manages battery testing. In some aspects, the battery tray 108 may be external to the rack power supply 102.

The DC output 112 provides current that is received by the server arrays 104 at a DC input connection 114. Although a single DC input connection 114 is described, the server arrays 104 may be coupled to multiple power supplies 102. And although the rack power supply 102 is depicted as coupled to a single set of rack mounted server arrays 104, the rack power supply 102 may be coupled to multiple sets of rack mounted server arrays 104. The current is received by the server arrays 104 and distributed to one or more individual servers $118_1$, $118_2$, ... $118_n$.

Each server 118 may be configured to initialize when receiving a current above a minimum voltage level. For example, the servers 118 may be configured to initialize when receiving a source voltage of at least 50 volts. However, if all of the servers 118 of the array 104 receive voltage simultaneously, this may create a sudden draw on the current provided by the power supply. If one or more of the rectifiers has failed and enough current is not output, this sudden draw caused by all of the servers initializing in response to detecting the minimum voltage may cause the voltage to drop below the initialization threshold. Such an event may cause one or more of the initializing servers to fail.

As such, the servers 118 may be coupled to one or more voltage dividers $116_1$, $116_2$, ... $116_N$. The voltage dividers 116 modify the voltage of the current received via the DC input connection 114 to assist with initialization of the servers 118. Each of the voltage dividers 118 may be configured with different resistances to alter the input voltage received by the corresponding server or servers 118. Using the voltage dividers 116 alters the minimum initialization voltage of the corresponding server 118 such that a given voltage divider 116 may be configured differently to cause the input voltage of the corresponding server 118 to be above or below the server initialization threshold voltage based upon the voltage of the input DC power source within a particular voltage range.

By modifying the voltage using a voltage divider, a given input voltage may be modified to be above or below the voltage level necessary to initialize the corresponding server, even if the original input voltage would not be sufficient. Although a configuration using voltage dividers is shown as an example, any circuit configuration capable of altering an input voltage such that some components coupled to the circuit reach a minimum initialization voltage while others do not could be utilized to initialize the servers 118. An exemplary configuration of the voltage dividers 116 is described further below (see FIG. 3).

The servers 118 may include one or more processors and memories (not shown). Although the present example is described with respect to servers 118, the techniques and devices described therein may be utilized to initialize any sort of electrical device that may receive power via a power supply as described, such as disk arrays, network components (e.g., switches or routers), server blades, audio equipment, video equipment, or any other electrical device that initializes based on a particular input voltage.

Figure 2:
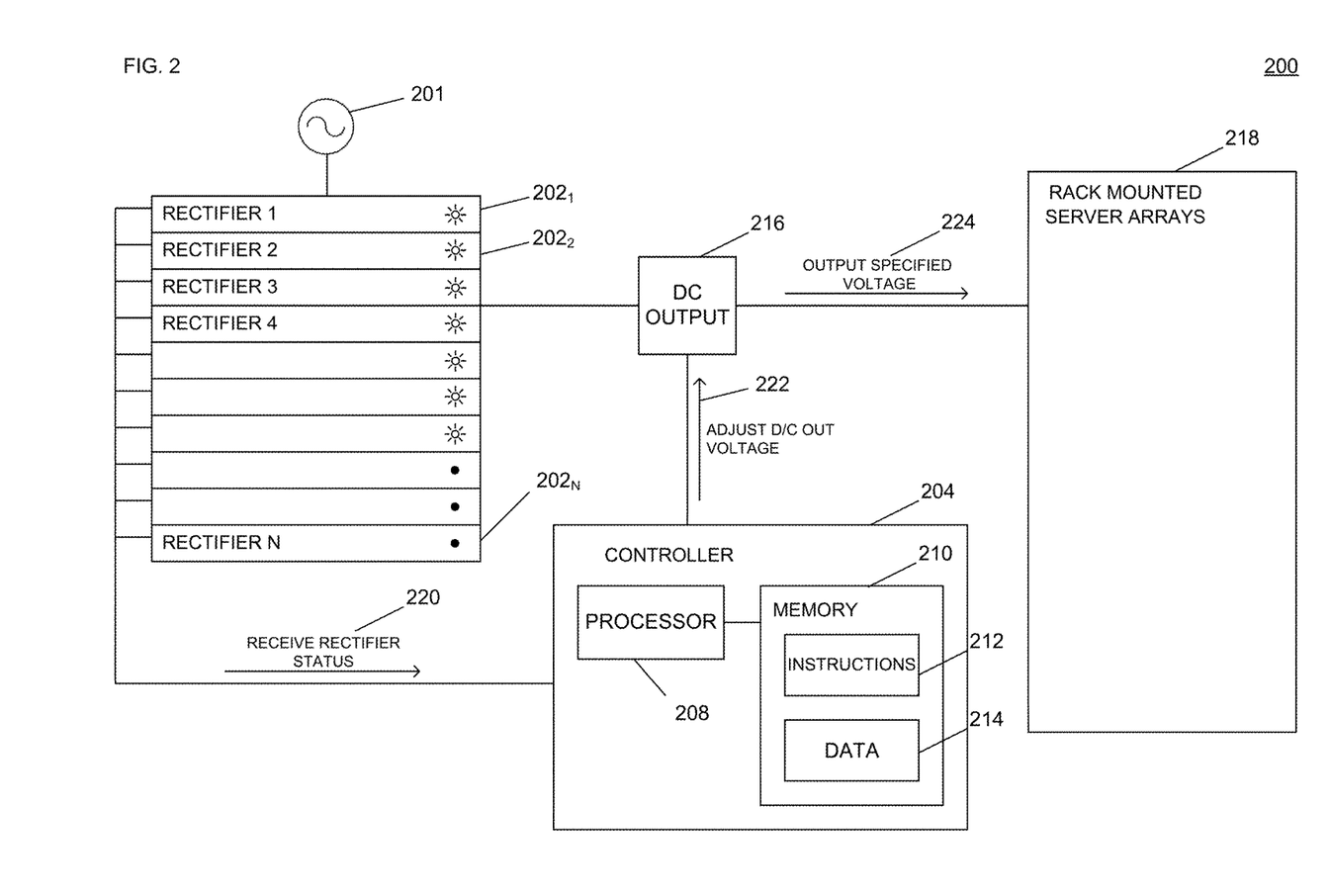
FIG. 2 is a block diagram depicting an example of a voltage dependent initialization operation performed using a rack power supply in accordance with aspects of the disclosure.

FIG. 2 is a block diagram depicting an example of a voltage dependent initialization operation performed using a rack power supply in accordance with aspects of the disclosure. The diagram depicts a plurality of rectifiers 202 that receive power from an AC power source 201. The rectifiers 202 may be coupled to a DC output 216 that provides direct current to a set of rack-mounted server arrays 218. The rectifiers 202 may also be coupled to a controller 204. The controller 204 operates to control the voltage of the DC current provided to the rack-mounted server arrays 218 via the DC output 216.

The rectifiers 202 may output status information that is read by the controller 204. For example, each rectifier 202 may perform internal diagnostics to indicate whether the given rectifier is operating within specification. Rectifier status information may also be provided in various other manners. For example, the rectifiers 202 may be coupled to status monitoring hardware that identifies whether each rectifier is providing electrical power to the DC output 216. The rectifier status information is provided to the controller 204 at action 220 of the process.

The controller 204 may be laptop computer, a desktop computer, a netbook, a rack-mounted server, a smartphone, a cellular phone, or any other device containing programmable hardware or software for executing instructions. The controller 204 may include a processor 208, a memory 210 and other components typically present in general purpose computers. The memory 210 may store instructions 212 and data 214 that are accessible by the processor 208. The processor 208 may execute the instructions 212 and access the data 214 to control the operations of the controller 204 and to control the rectifiers 202 and the DC output 210.

The processor 208 may be any suitable processor, such as various commercially available general purpose processors. Alternatively, the processor 208 may be a dedicated controller such as an application-specific integrated circuit ("ASIC") or a field-programmable gate array ("FPGA").

The memory 210 may be any type of tangible memory operative to store information accessible by the processor 208, including a computer-readable medium, or other medium that stores data that may be read with the aid of an electronic device, such as a hard-drive, memory card, read-only memory ("ROM"), random access memory ("RAM"), digital versatile disc ("DVD") or other optical disks, as well as other write-capable and read-only memories. The system and method may include different combinations of the foregoing, whereby different portions of the instructions and data are stored on different types of media.

Although FIG. 2 functionally illustrates the processor 208 and memory 210 as each being within a single block respectively, it should be understood that the processor 208 and memory 210 may actually comprise multiple processors and memories that may or may not be stored within the same physical housing. Accordingly, references to a processor, computer or memory will be understood to include references to a collection of processors, computers or memories that may or may not operate in parallel.

The instructions 212 may be any set of instructions to be executed directly (such as machine code) or indirectly (such as scripts) by the processor 208. For example, the instructions 212 may be stored as computer code on a non-transitory computer-readable medium. In that regard, the terms "instructions" and "programs" may be used interchangeably herein. The instructions 212 may be stored in object code format for direct processing by the processor 208, or in any other computer language including scripts or collections of independent source code modules that are interpreted on demand or compiled in advance. Functions, methods and routines of the instructions are explained in more detail below (see FIGS. 3-4).

In order to facilitate the operations of the system 200, the instructions 212 may perform monitoring of the rectifiers 202 and adjustment of the voltage provided by the DC output 216 based on the status of the rectifiers 202. The controller 204 may determine the number of active rectifiers 202 and adjust the output voltage of the DC output 216 such that only a particular number of the rack-mounted server arrays 218 rise above a particular initialization voltage.

The controller 204 receives status information about the rectifiers 202 at action 220, and adjusts the DC output voltage at action 222. The instructions 212 may include executable code to assist in these tasks, such as one or more applications for receiving and monitoring rectifier status and controlling of the output of the DC output 216. The rectifier status may be received via any communication format, such as over a wired or wireless network or a system bus. Similarly, the controller 204 may communicate with the DC output 216 to adjust the output voltage via a wired or wireless network, a system bus, or any other communication format. For example, the controller 204 may communicate with the rectifiers 202 and the DC output 216 via the Power Management Bus ("PMBUS") standard.

Data 214 may be retrieved, stored or modified by the processor 208 in accordance with the instructions. For instance, although the architecture is not limited by any particular data structure, the data may be stored in computer registers, in a relational database as a table having a plurality of different fields and records, Extensible Markup Language ("XML") documents or flat files. The data may also be formatted in any computer readable format such as, but not limited to, binary values or Unicode. The data may comprise any information sufficient to identify the relevant information, such as numbers, descriptive text, proprietary codes, references to data stored in other areas of the same memory or different memories (including other network locations) or information that is used by a function to calculate the relevant data.

The controller 204 may be coupled to a network (not shown), and the network may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, hypertext transfer protocol ("HTTP") and simple mail transfer protocol ("SMTP"), and various combinations of the foregoing. It should be appreciated that a typical system may include a large number of connected computers. For example, the functionality of the controller 204 may be spread across multiple nodes, with separate nodes providing different functionality to manage and control components of the power supply and rack mounted components.

Although certain advantages are obtained when information is transmitted or received as noted above, other aspects of the system and method are not limited to any particular manner of transmission of information. For example, in some aspects, information may be sent via a medium such as an optical disk or portable drive. In other aspects, the information may be transmitted in a non-electronic format and manually entered into the system.

At action 224, the DC output 216 outputs a particular voltage as directed by the controller 204 based on the status of the rectifiers 202. In the instant example, there may be 10 rectifiers 7 of which are functioning properly. Assuming the rectifiers 202 each output the same amount of DC power, the power supply is capable of functioning at 70% of full capacity. As such, it may be appropriate to only initialize 70% of the components of the rack-mounted server arrays 218, to ensure that the rack-mounted server arrays 218 do not draw more power than the rectifiers 202 are capable of providing.

The controller 204 is provided with the status of the rectifiers 202 (e.g., 7/10 operational) at action 220. In response, the controller 204 may adjust the output voltage within a particular range of values. For example, the controller 204 may adjust a value stored in a register of the rectifiers 202 via a broadcast message. For example, the controller 204 may specify a voltage between 52 volts and 53 volts to be output by the DC output 216. The voltage range may be associated with a particular set of volts that will be sufficient to initialize the components of the rack-mounted server arrays 218. For example, the voltage output of 53 volts may be sufficient to cause all of the components to initialize, whereas the voltage output of 52 volts may be insufficient to initialize any of the components. The individual components of the rack-mounted server array 218 may be associated with particular mechanisms to ensure that they initialize at different particular input voltages, such as the voltage dividers described below (see FIG. 3).

In the present example, 70% of the rectifiers 202 are operational. As such, the controller 204 may specify an output voltage 70% of the way to the maximum output voltage. Where the voltage range is 52-53 volts, this might result in an output voltage of 52.7 volts. Although 52-53 volts is provided as an example, any range of appropriate voltages could be used. A linear voltage increase is also not required depending upon the needs of the power supply and rack-mounted components. For example, a 50% rectifier status might result in more or less than an output voltage of 52.5 volts.

Depending upon the output voltage provided by the DC output 216, components of the rack-mounted server arrays 218 are initialized. The process by which individual components are or are not initialized is described further below (see FIGS. 3-4).

Figure 3:
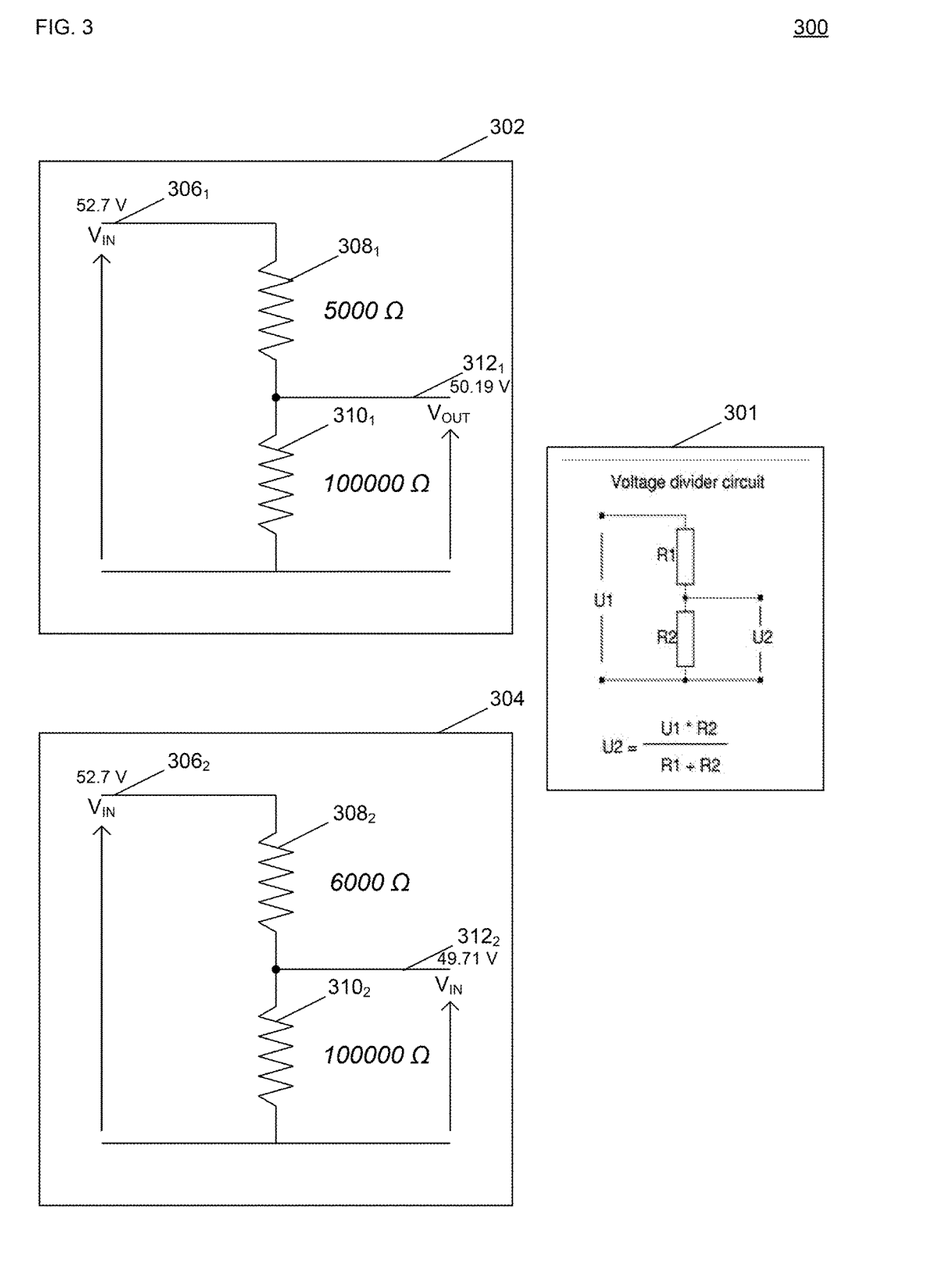
FIG. 3 is a schematic diagram depicting an example of voltage dividers in accordance with aspects of the disclosure.

FIG. 3 depicts an arrangement 300 including two exemplary voltage dividers 302 and 304 in accordance with aspects of the disclosure. As described above (see FIG. 1), the individual components of the rack-mounted server arrays may employ voltage dividers to alter the input voltage provided by the power supply. Although the voltage dividers are described as having physical resistors with particular resistances, these dividers may also be dynamically configurable based on various instructions and methods, such as by a software controller. The components of the rack-mounted server arrays may operate by initializing (e.g., booting up and executing code) in response to power input voltage rising above a particular level. Different components of the rack-mounted server arrays may have different voltage divider configurations to ensure that the components initialize at different input voltages, even though the components may be otherwise similar. Although voltage dividers are described as one way to initialize components of the arrays at different voltages, any technique or hardware that is capable of altering input voltage for the components might be used to perform these actions.

In the present example, the two voltage dividers 302 and 304 are coupled to components that each require an input voltage of 50 volts to initialize. Both the first voltage divider 302 and the second voltage divider 304 receive an input voltage 306 of 52.7 volts. For example, this input voltage of 52.7 volts may correspond to a 70% rectifier health status as described above (see FIG. 2).

The first voltage divider 302 and the second voltage divider 304 are each configured with a first resistor 308 and a second resistor 310. However, the resistors in each voltage divider provide a different level of resistance. The first resistor $308_1$ of the first voltage divider 302 provides a resistance of 5,000 ohms, while the first resistor $308_2$ of the second voltage divider 304 provides a resistance of 6,000 ohms. The second resistor 310 of both the first voltage divider 302 and the second voltage divider 304 provide a resistance of 100,000 ohms.

Such voltage dividers operate according to well known electrical principles, as illustrated in element 301. A voltage divider operates such that the output voltage of the circuit can be determined by the equation:

$$U2 = \frac{U1 * R2}{R1 + R2} \quad \text{(Eq. 1)}$$

Where U1 and U2 are the output and input voltages, respectively, and R1 and R2 are the resistance of the resistors. Applying the above principle, the output voltage of the first voltage divider 302 would be 50.19 volts, sufficient to cross the 50 volt initialization threshold of the corresponding component coupled to the first voltage divider 302. The output voltage of the second voltage divider 304 would be 49.71 volts, which would fail to cross the initialization threshold of the corresponding component coupled to the second voltage divider 304. As such, the component coupled to the first voltage divider 302 would initialize but the component coupled to the second voltage divider 304 would not. Each of the components of the rack-mounted server arrays may be similarly coupled to a voltage divider with a different resistor configuration, such that the higher the input voltage, the more components are initialized. For example, if 70% of the components were configured with voltage dividers that would result in an input voltage of 52.7 volts crossing above the initialization threshold, then those 70% of the components would initialize. The resistors of the voltage dividers of each component may be configured such that a small number (e.g., 10%) would initialize with a low voltage in the voltage range (e.g., 52.1 volts), a larger number (e.g., the previous 10% plus another 10%) with a higher voltage (e.g., 52.2 volts), and so on.

Figure 4:
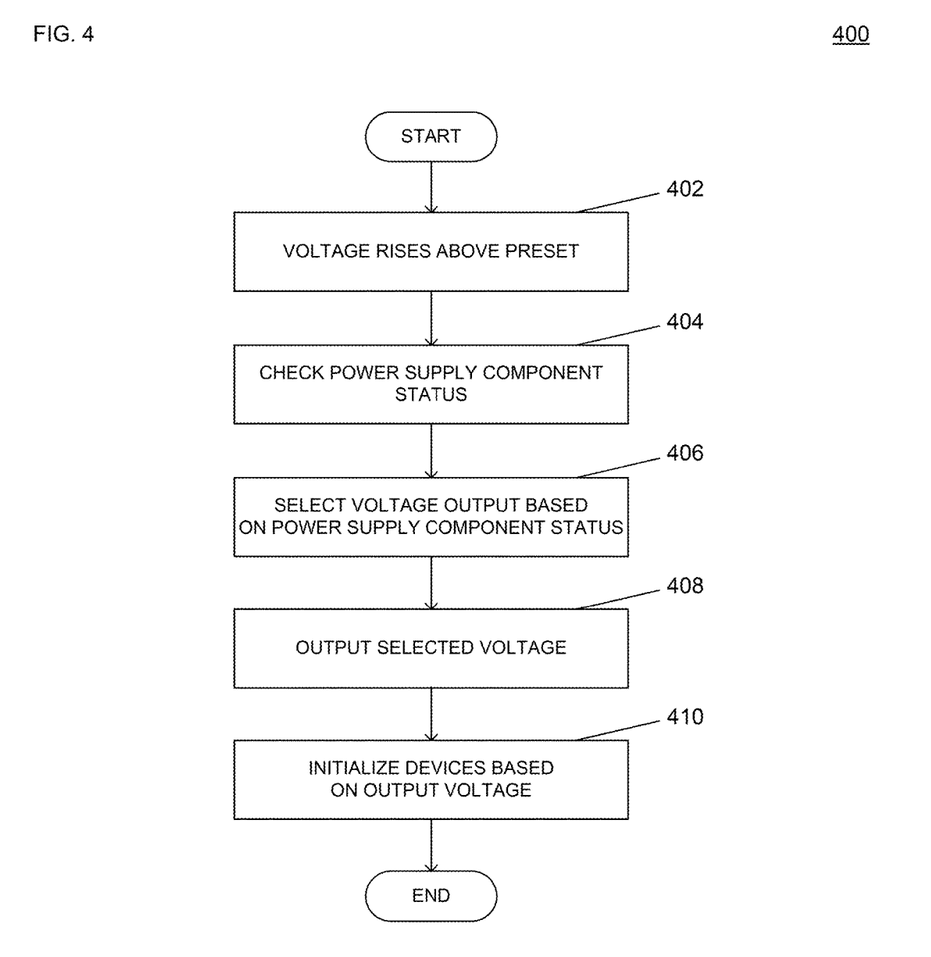
FIG. 4 is a flow diagram depicting an example of a method for initializing rack-mounted components in accordance with aspects of the disclosure.

FIG. 4 is a flow diagram depicting an example of a method 400 for initializing components based on a particular voltage. The method 400 operates to initialize a particular subset of a set of electrical components based on the status of the power supply or power supplies powering the electrical components. By monitoring the status of power supply components (e.g., the rectifiers described above with respect to FIGS. 1-3), the method 400 can alter the output voltage of the power supply. A particular output voltage may result in a particular subset of electrical components may rise above an initialization threshold, thus ensuring that only that subset draws power from the power supply, while the remaining electrical components (e.g., in a different subset) do not draw power from the power supply. This ensures that the current draw on the power supply(ies) conforms to the availability of power supply components, and thus prevents the power supply from being overloaded. The electrical components in the subset that receives power may be selected by the controller based on the status of one or more of the power supplies.

At action 402, an available voltage rises above an initial preset threshold. For example, the power supply may provide a base level of power, notifying a controller that the power supply is capable of providing power to a set of rack-mounted components. The action of rising above the initial preset may correspond to the power supply receiving power from an external source, such as AC power received from a power grid or generator.

At action 404, a status is monitored of one or more power supply components, such as the rectifiers described above (see FIGS. 1-3). The power supply component status may be used to identify the amount of current the power supply can safely output for the purpose of powering electrical devices. For example, if certain components of the power supply are not functioning properly, then the power supply may not be able to output as much current as if all of the components were functioning nominally.

At action 406, a voltage output is selected based on the power supply component status. The voltage output may be based upon a particular range of voltages, with the point in the range selected based on the availability of the power supply components. For example, if 50% of the rectifiers of the power supply are available, then an output voltage 50% of the way into the range may be selected. Thus, if the range of voltages is 52-53 volts, an output voltage of 52.5 volts might be selected.

At action 408, voltage is output at the selected voltage. For example, a controller that receives status information from the power supply components may communicate with a voltage output to instruct the voltage output to provide current at 52.5 volts to the electrical devices.

At action 410, electrical devices are initialized based on the output voltage. As described above (see FIGS. 1-3), a particular subset may be initialized based on the selected output voltage. Voltage dividers may be utilized to alter the voltage received by the electrical devices to modify the voltage to be above or below an initialization threshold in order to ensure that only the particular subset of electrical devices are initialized. In this manner, the particular subset of electrical devices may be identified without a need to directly communicate with the electrical devices themselves or transmit data from a controller to the devices.

The actions of the illustrated methods are not intended to be limiting. The functionality of the methods can exist in a fewer or greater number of actions than what is shown and, even with the depicted methods, the particular order of events may be different from what is shown in the figures.

Controlling the initialization of electrical devices in this manner advantageously allows for improved safety and control of the electrical devices, while eliminating the need to communicate directly with said devices to control the initialization. In this manner, the power supply and the components powered thereby may be decoupled such that the power supply does not need to communicate with the electrical components to avoid a scenario where the electrical components draw more power than the power supply can support. The electrical components can be reconfigured to initialize at different output voltages by adjusting the voltage dividers associated with each component. Thus the instant disclosure provides a flexible, safe, and straightforward method, apparatus, and system for initializing electrical components, such as computer server arrays.

As these and other variations and combinations of the features discussed above can be utilized without departing from the disclosure as defined by the claims, the foregoing description of the implementations should be taken by way of illustration rather than by way of limitation of the disclosure as defined by the claims. It will also be understood that the provision of examples of the disclosure (as well as clauses phrased as "such as," "e.g.", "including" and the like) should not be interpreted as limiting the disclosure to the specific examples; rather, the examples are intended to illustrate only some of many possible implementations.

The invention claimed is:

1. A method for providing power to a plurality of electrical devices, the method comprising:
   receiving status information from one or more power supply components of one or more power supplies, the status information indicating an amount of current or power the one or more power supplies are capable of outputting;
   selecting an output voltage to be provided by the one or more power supplies to the plurality of electrical devices based on the status information, the output voltage being selected to initialize a first subset of the plurality of electrical devices, where the first subset does not include all of the plurality of electrical devices;
   controlling, with a controller, the one or more power supplies to provide the selected output voltage to the first subset of the plurality of electrical devices so that the first subset is initialized; and
   reducing, but not eliminating, the selected output voltage below an initialization threshold of a second subset of the plurality of electrical devices so that the second subset is not initialized with the reduced but not eliminated selected output voltage.

2. The method of claim 1, wherein the output voltage is determined in a particular voltage range.

3. The method of claim 2, further comprising:
   determining a power output percentage from the status information, wherein the power output percentage corresponds to a current power output level of the one or more power supplies divided by a maximum power output level of the one or more power supplies;
   wherein selecting the output voltage is done such that the output voltage is a sum according to the equation:

$v_{out} = v_{min} + (p*(v_{max} - v_{min}))$, where $v_{out}$ is the output voltage, $v_{min}$ is a minimum voltage in the particular voltage range, p is the power output percentage, and $v_{max}$ is a maximum voltage in the particular voltage range.

4. The method of claim 1, wherein the power supply components are rectifiers.

5. The method of claim 1, wherein the electrical devices are at least one of rack-mounted server arrays or rack-mounted disk arrays.

6. The method of claim 1, wherein the method is performed by a shelf controller.

7. The method of claim 1, wherein the output voltage is greater than a predefined initialization voltage for the electrical devices.

8. The method of claim 1, the method further comprising adjusting the selected output voltage to remain above a predefined initialization voltage for the first subset of electrical devices after initialization.

9. The method of claim 1, wherein the selected output voltage is reduced by at least one voltage divider coupled between the one or more power supplies and the second subset of the plurality of electrical devices.

10. The method of claim 1, wherein the first subset of the plurality of electrical devices is chosen such that initialization of the first subset of the plurality of electrical devices draws less current than the one or more power supplies are rated to support.

11. An apparatus for providing power to a plurality of electrical components, the apparatus comprising:
    at least one voltage divider coupled to at least one of the plurality of electrical components; and
    a power supply for providing power to the plurality of electrical components at a particular output voltage, the power supply including one or more power supply components and a controller coupled to the one or more power supply components;
    wherein the controller is configured to:
      receive status information from the one or more power supply components, the status information indicating an amount of current or power the power supply is capable of outputting;
      select an output voltage to be provided by the power supply to the plurality of electrical devices based on the status information, the output voltage being selected to initialize a first subset of the plurality of electrical devices, where the first subset does not include all of the plurality of electrical devices;
      control the power supply to provide the selected output voltage to the first subset of the plurality of electrical devices so that the first subset is initialized; and
      reduce, but not eliminate, the selected output voltage below an initialization threshold of a second subset of the plurality of electrical devices so that the second subset is not initialized with the reduced but not eliminated selected output voltage.

12. The apparatus of claim 11, wherein the selected output voltage is reduced below the initialization threshold using the at least one voltage divider.

13. The apparatus of claim 11, wherein the one or more power supply components are rectifiers.

14. The apparatus of claim 11, wherein the one or more power supply components communicate the status information to the controller via a power management bus.

15. The apparatus of claim 11, wherein the output voltage is determined in a particular voltage range.

16. The apparatus of claim 15, wherein the controller is further configured to:
    determine a power output percentage from the status information, wherein the power output percentage corresponds to a current power output level of the power supply divided by a maximum power output level of the one or more power supplies;
    wherein the controller selects the output voltage such that the output voltage is the sum according to the following equation:

$v_{out} = v_{min} + (p*(v_{max} - v_{min}))$, where $v_{out}$ is the output voltage, $v_{min}$ is a minimum voltage in the particular voltage range, p is the power output percentage, and $v_{max}$ is a maximum voltage in the particular voltage range.

17. A non-transitory computer readable storage medium storing instructions thereof, the instructions, when executed by a processor, cause the processor to perform a method for providing power to a plurality of electrical devices, the method comprising:
- receiving status information from one or more power supply components of one or more power supplies, the status information indicating an amount of current or power the one or more power supplies are capable of outputting;
- selecting an output voltage to be provided by the one or more power supplies to the plurality of electrical devices based on the status information, the output voltage being selected to initialize a first subset of the plurality of electrical devices, where the first subset does not include all of the plurality of electrical devices;
- controlling the one or more power supplies to provide the selected output voltage to the first subset of the plurality of electrical devices, such that the first subset of the plurality of electrical devices is initialized; and
- reducing, but not eliminating the selected output voltage below an initialization threshold of a second subset of the plurality of electrical devices so that the second subset is not initialized with the reduced but not eliminated selected output voltage.

18. The computer readable medium of claim 17, wherein the output voltage is determined in a particular voltage range.

19. The computer readable medium of claim 18, wherein the instructions further comprise:
- determining a power output percentage from the status information, wherein the power output percentage corresponds to a current power output level of the one or more power supplies divided by a maximum power output level of the one or more power supplies;
- wherein selecting the output voltage is done such that the output voltage is a sum of chosen via a formula:

$$v_{out} = v_{min} + (p*(v_{max} - v_{min})),$$

where $v_{out}$ is the output voltage, $v_{min}$ is a minimum voltage in the particular voltage range, p is the power output percentage, and $v_{max}$ is a maximum voltage in the particular voltage range.

20. The computer readable medium of claim 17, wherein the power supply components are rectifiers.

* * * * *